Figures 1, 2:
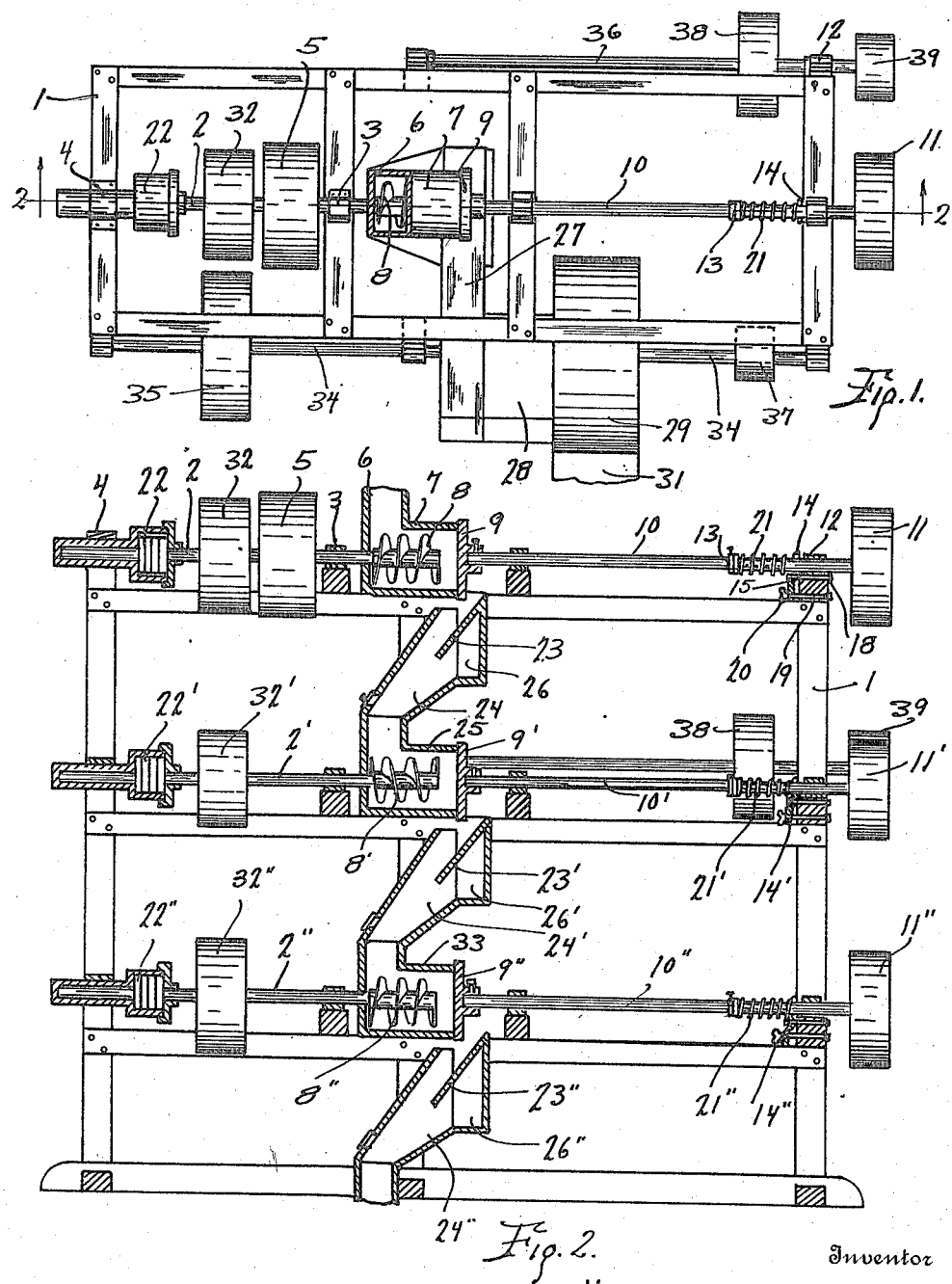

H. H. LANGBEHN.
PEELER AND SMUTTER.
APPLICATION FILED DEC. 9, 1913.

1,184,969.

Patented May 30, 1916.

Witnesses
Harold Scantlebury
Edna Broyles

Inventor
Henry H. Langbehn
By Herbert E. Smith
Attorney

UNITED STATES PATENT OFFICE.

HENRY H. LANGBEHN, OF SPOKANE, WASHINGTON.

PEELER AND SMUTTER.

1,184,969.	Specification of Letters Patent.	Patented May 30, 1916.

Application filed December 9, 1913. Serial No. 805,548.

*To all whom it may concern:*

Be it known that I, HENRY H. LANGBEHN, a citizen of the United States, residing at Spokane, in the county of Spokane and State of Washington, have invented new and useful Improvements in Peelers and Smutters, of which the following is a specification.

This invention relates to apparatus for removing smut and bran and also the bee wings from wheat by attritive action on the wheat kernels.

The novel feature of my invention consists in providing a casing for passage of the wheat therethrough, under pressure from a source such as a worm, a rotating spring controlled disk normally closing the outlet of the casing so as to retard discharge therefrom in such a manner that the debranning operation will take place wholly inside of the cylinder and between the end of the worm and said closure.

The invention has other objects and features which will be more fully described in connection with the accompanying drawing and will be more particularly pointed out in and by the appended claim.

In the drawing:—Figure 1, is a plan view of the device with parts broken away to show the inlet for the wheat. Fig. 2 is a vertical sectional view on line 2—2 of Fig. 1.

Throughout the separate views the same part is designated by the same reference character.

Referring more particularly to the drawings, 1 is a rectangular framework at the top of which is mounted a shaft 2 substantially on the central line of the frame. The shaft 2 is mounted in bearings such as 3 and 4 and is driven by a pulley 5 which may be belted to any suitable driving force. At the right hand end of shaft 2, this shaft extends through a chute such as 6 through which grain is delivered to the apparatus. The lower end of the chute 6 is extended at right angles to form a cylindrical casing such as 7 in which operates a worm 8 carried by the end of the shaft 2. Now the right hand end of the casing 7, as shown in the drawings, is closed by a disk 9 which, it will be understood, is intended to revolve in a direction opposite that of the worm 8 and shaft 2, the disk 9 being carried by a shaft 10 driven by a pulley 11.

The shaft 10 is provided with a bearing 12 and carries a collar 13. Between the collar 13 and the bearing 12 is a fork 14, the prongs of which project upwardly and around the shaft 10. The fork 14 is intended to bear against the frame 1 where it supports the bearings 12 at the point 15, and is provided with holes through which suitable bolts 18 and 19 project, the bolt 19 being threaded and provided with winged nut 20 by which the position of the fork 14 can be adjusted. Intermediate the fork 14 and the collar 13 is a spring 21 which tends to throw the shaft 10 and the disk 9 in the direction of the casing 7, the amount of such thrust depending upon the position of the fork 14. It will be seen, moreover, that the shaft 2 is provided with a thrust bearing 22 which is for the purpose of neutralizing the thrust of the screw conveyer 8.

It will be understood that grain having smut thereon is fed through the chute 6 and will be forced by the screw conveyer 8 against the disk 9 and the two revolving in opposite directions will cause the kernels of grain to be rolled in attritive engagement against one another. Moreover, this rubbing will effectually remove the smut from the grain. As the grain is pressed against the disk 9 the spring 21 will yield sufficiently to allow the grain to drop out of the cylinder 7 onto a baffle 23 by which it is projected into a chute 24 leading to a second cylinder 25, similar to the cylinder 7. Underneath the baffle 23 is a space 26 which connects with a flue 27 which leads into a chimney 28, the chimney 28 being connected with a fan casing 29 within which is a suction fan of the centrifugal type, the delivery from which is shown at 31 in Fig. 1. Consequently, the smut which has been completely removed from the grain by means of the rolling action above mentioned is sucked away from the grain as it falls past the lower end of the baffle 23 and discharged to any convenient place.

While treating the wheat for removal of smut it is also desirable to remove the bee wings or woolly material therefrom as well as the bran proper, and for such purposes I provide below the shaft 2 a shaft 2' which carries the belt pulley 32', the thrust bearing 22' and the conveyer 8', which operates within the casing 25. Coöperating with the conveyer 8' is a disk 9' carried by the shaft 10' on which is a belt pulley 11' and a spring 21' associated with a fork 14'.

It will be understood that the various parts designated by primed reference characters and operating in connection with the cylinder 25, are the same as those of the parts having similar reference characters but not primed, and operating in connection with the cylinder 7. It will be understood, moreover, that the screw conveyer 8' and the disk 9' operate to remove the bee wings or woolly material from the grain.

From the cylinder 25 the grain drops out onto a baffle 23' beneath which is a recess 26' and as the grain falls off of the baffle 23' the bee wings are sucked into the space 26' into a flue and then into the chimney 28. The grain is delivered by the baffle 23' into a chute 24' which leads to a cylinder 33 in which is a third screw conveyer 8" and a disk 9" for closing the open end of the cylinder 33. The elements 8" and 9" revolve in opposite directions as in the case of the similar elements previously described, 8" being carried by a shaft 2" on which is a belt pulley 32", and a thrust bearing 22". The disk 9" is carried by a shaft 10" having thereon a pulley 11" and a spring 21" for adjusting the pressure of the disk 9" toward the open end of the cylinder 33 the amount of tension being adjusted by a fork 14". It will be understood that in cylinder 33 the inner bran is removed from the wheat and, as the wheat is forced out of the cylinder it falls onto a baffle 23" under which is a space 26" connecting with a flue which connects in turn with a chimney 28 and then with a fan casing 29. As the grain falls off of the end of the baffle 23" the bran is sucked into space 26" and then into the chimney, while the cleaned grain is thrown into the chute 24" from which it may be delivered to any convenient point.

It will be understood that parts operating in connection with cylinder 33 and having reference characters which are double primed have the same functions as parts which have similar reference characters but unprimed which operate in connection with the cylinder 7.

It will be understood that any convenient method of driving the shafts may be employed but I prefer to drive shafts 2, 2' and 2" by means of the pulleys 32, 32' and 32". Shaft 2 is driven directly by a belt on the pulley 5. Incidentally, also I drive the fan 30 from the shaft 2 at the same time. The fan 30 is mounted on a shaft 34, and carries a driving pulley 35.

In order to drive the shafts 10, 10' and 10" I provide a counter shaft 36, which is on the opposite side of the frame 1 from the shaft 34. The shaft 34 carries a pulley 37 which is belted to a pulley 38 on the shaft 36. Moreover, the shaft 36 carries a pulley 39 around which may be trained a belt which also runs around the pulleys 11, 11' and 11".

It will be observed that pulleys 32' and 11' are somewhat smaller than the corresponding pulleys on the other two shafts, consequently, the shafts driven by 32' and 11' will be rotated more rapidly than the shafts 2, 2' and 10, 10', respectively. This is because the woolly material require somewhat more pressure than the smut and bran proper in order to remove it. It will be understood, moreover, that the reason for making the tension of the springs 21, 21' and 21" adjustable, is that different grades and varieties of wheat require different pressure for the removal of the smut and the two varieties of bran.

It will be understood that while I have shown and described the preferred form of my invention, that various modifications may be made therein without departing from the spirit of my invention as set forth in the appended claim.

Having thus described my invention, what I claim is:—

An apparatus for cleaning and debranning grain comprising a casing having a grain inlet and a grain outlet, a spring controlled closure normally acting to close said outlet and restrict the discharge of grain therethrough, a shaft supporting said closure and located outside said casing, means for driving said shaft to rotate said closure, a worm shaft extending longitudinally along said casing toward but not into engagement with said closure, and a worm on said worm shaft in spaced relation with respect to said closure thereby forming a free grain receiving area between the worm and worm shaft and said closure for attritive debranning and cleaning action of the grain before the same is discharged from the casing, substantially as described.

In testimony whereof I affix my signature in the presence of two witnesses.

HENRY H. LANGBEHN.

Witnesses:
 HAROLD SCANTLEBURY,
 EDNA BROYLES.

Copies of this patent may be obtained for five cents each, by addressing the "Commissioner of Patents, Washington, D. C."